(12) United States Patent  (10) Patent No.: US 9,025,878 B2
Hirabayashi  (45) Date of Patent: May 5, 2015

(54) ELECTRONIC APPARATUS AND HANDWRITTEN DOCUMENT PROCESSING METHOD

(71) Applicant: Kabushiki Kaisha Toshiba, Tokyo (JP)

(72) Inventor: Hirotada Hirabayashi, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 131 days.

(21) Appl. No.: 13/680,409

(22) Filed: Nov. 19, 2012

(65) Prior Publication Data

US 2014/0079317 A1    Mar. 20, 2014

(30) Foreign Application Priority Data

Sep. 19, 2012  (JP) ................... 2012-205540

(51) Int. Cl.
*G06K 9/00* (2006.01)
*G06F 3/0488* (2013.01)

(52) U.S. Cl.
CPC ............... *G06K 9/00* (2013.01); *G06F 3/0488* (2013.01)

(58) Field of Classification Search
None
See application file for complete search history.

(56) References Cited

U.S. PATENT DOCUMENTS

| 5,698,822 | A | * | 12/1997 | Haneda et al. | 178/18.01 |
| 5,796,866 | A | * | 8/1998 | Sakurai et al. | 382/187 |
| 5,828,783 | A | * | 10/1998 | Ishigaki | 382/186 |
| 6,064,765 | A | * | 5/2000 | Hirayama | 382/189 |
| 6,151,611 | A | * | 11/2000 | Siegel | 715/224 |
| 6,307,955 | B1 | * | 10/2001 | Zank et al. | 382/121 |
| 6,999,622 | B2 | | 2/2006 | Komatsu | |
| 7,502,509 | B2 | * | 3/2009 | Sheets et al. | 382/186 |
| 2001/0036318 | A1 | | 11/2001 | Komatsu | |
| 2004/0165768 | A1 | * | 8/2004 | Zhang et al. | 382/162 |
| 2009/0127006 | A1 | * | 5/2009 | Lynggaard | 178/19.01 |
| 2011/0234516 | A1 | * | 9/2011 | Nakajima et al. | 345/173 |

FOREIGN PATENT DOCUMENTS

| JP | 02-113386 A | 4/1990 |
| JP | 09-258716 A | 10/1997 |
| JP | 11-143628 A | 5/1999 |
| JP | 11-327789 A | 11/1999 |
| JP | 2000-259335 A | 9/2000 |
| JP | 2011-204141 A | 10/2001 |
| JP | 2001-344063 A | 12/2001 |
| JP | 2001-345975 A | 12/2001 |
| JP | 2002-281209 A | 9/2002 |
| JP | 2008-276317 A | 11/2008 |

OTHER PUBLICATIONS

First Office Action mailed by Japan Patent Office on Mar. 12, 2013 in the corresponding Japanese patent application No. 2012-205540—4 pages.

* cited by examiner

*Primary Examiner* — Li Liu
(74) *Attorney, Agent, or Firm* — Knobbe, Martens, Olson & Bear LLP

(57) ABSTRACT

According to one embodiment, an electronic apparatus includes a display processor configured to display a first locus input by handwriting with a second color equal to a color of a background in an input mode, and to display a second locus input by handwriting with the first color in an erase mode, and a storage module configured to store a first stroke data corresponding to the first locus and a second stroke data corresponding to the second locus, wherein the display processor is configured display an area in which the first locus crosses the second locus with the second color if the first locus is input later than the second locus, and to display the area with the first color if the first locus is input earlier than the second locus.

9 Claims, 8 Drawing Sheets

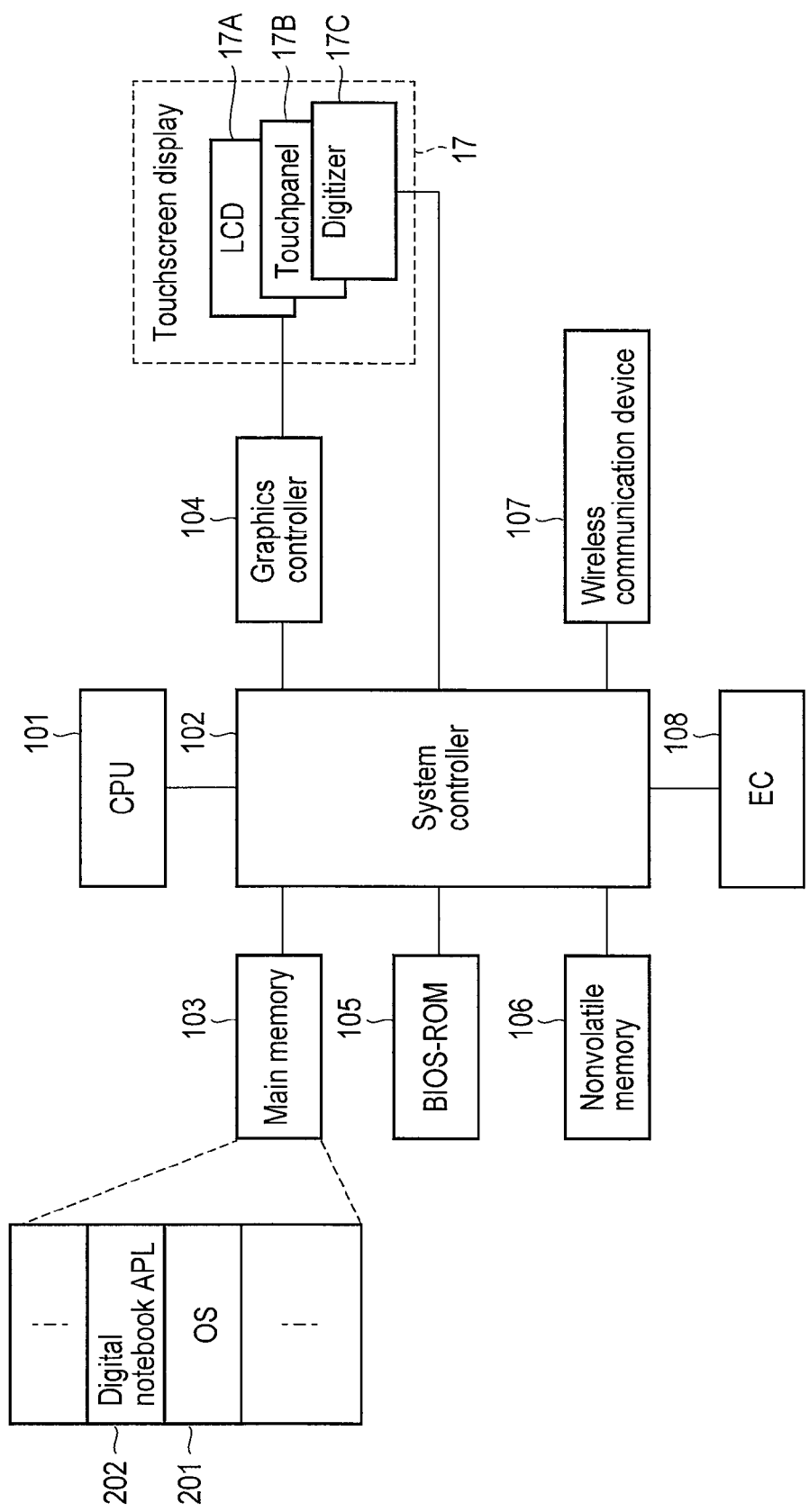
F I G. 3

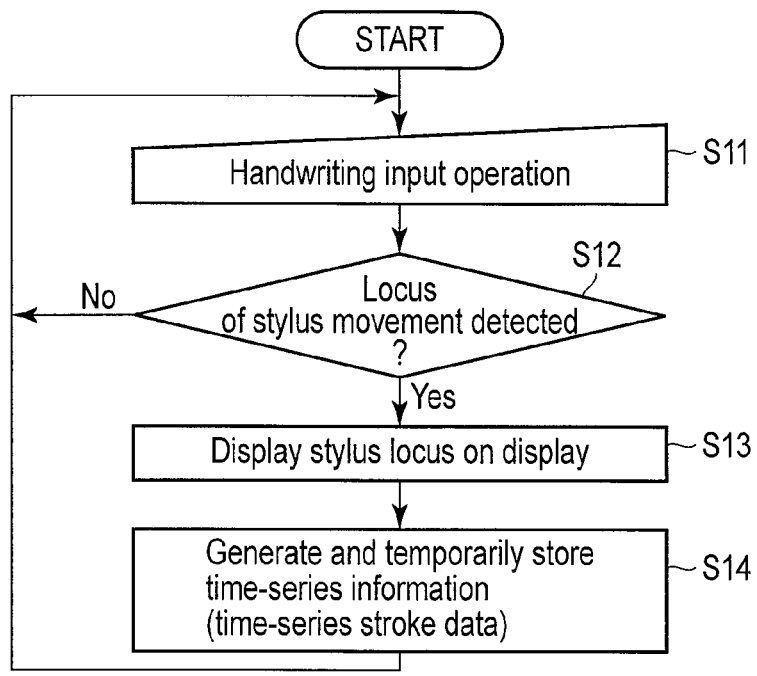
F I G. 5
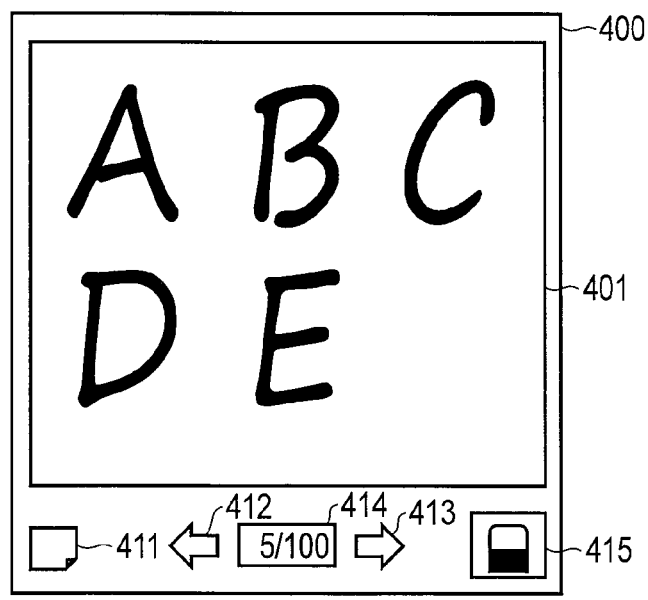
F I G. 6

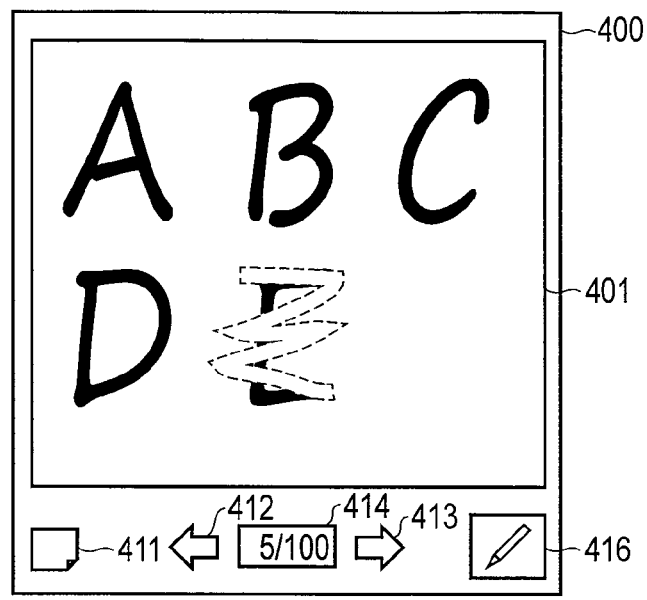
F I G. 7
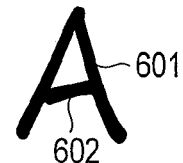
F I G. 8
| Number | Pen type | Time | Point information |
|---|---|---|---|
| 1 | Black | 10:00:05.10 | (10,10)-(50,12)... |
| 2 | Black | 10:00:05.50 | ... |
F I G. 9

| Number | Stylus type | Time | Point information |
|---|---|---|---|
| 8 | Black | 10:00:20.10 | (40,50)-(60,51)... |
| 9 | Black | 10:00:20.50 | ... |
| 10 | Black | 10:00:21.00 | ... |
| 11 | Eraser | 10:00:28.00 | ... |

| Recognized character | Included strokes | Circumscribed rectangle (upper left coordinates – lower right coordinates) | Other data |
|---|---|---|---|
| A | 1, 2 | (10,10) - (30,30) | ... |
| B | 3, 4 | (40,10) - (60, 30) | ... |
| C | 5 | (70,10) - (90, 30) | ... |
| D | 6, 7 | (10,50) - (30, 70) | ... |
| E | 8, 9, 10 | (40,50) - (60, 70) | ... |
| (Eraser) | 11 | (45,55) - (55, 75) | ... |

| Number | Stylus type | Time | Point information |
|---|---|---|---|
| 12 | Black | 110:00:35.00 | (40,50)-(60,51)... |
| 13 | Black | 10:00:35.50 | ... |
| 14 | Black | 10:00:36.00 | ... |

| Recognized character | Included strokes | Circumscribed rectangle (upper left coordinates – lower right coordinates) | Other data |
|---|---|---|---|
| A | 1, 2 | (10,10) - (30,30) | ... |
| B | 3, 4 | (40,10) - (60, 30) | ... |
| C | 5 | (70,10) - (90, 30) | ... |
| D | 6, 7 | (10,50) - (30, 70) | ... |
| E | 8, 9, 10 | (40,50) - (60, 70) | ... |
| (Eraser) | 11 | (45,55) - (55, 75) | ... |
| F | 12, 13, 14 | (45,55) - (55, 75) | ... |

ELECTRONIC APPARATUS AND HANDWRITTEN DOCUMENT PROCESSING METHOD

CROSS-REFERENCE TO RELATED APPLICATIONS

This application is based upon and claims the benefit of priority from Japanese Patent Application No. 2012-205540, filed Sep. 19, 2012, the entire contents of which are incorporated herein by reference.

FIELD

Embodiments described herein relate generally to processing of handwritten documents.

BACKGROUND

In recent years, various electronic apparatuses such as tablets, PDAs, and smartphones have been developed. Most of electronic apparatuses of these types include touchscreen displays to facilitate input operation performed by users.

The user can instruct the portable electronic apparatus to execute functions which are associated with menus or objects that are displayed on the touchscreen display, by touching the menu or objects on the touchscreen display by the finger.

The user can cause the touchscreen display to display handwritten characters, by writing characters on the touchscreen display by the stylus or finger. Although there are the cases where the user wishes to erase displayed handwritten characters, the user has a sense of operation which is different from a sense which the user has when the user erases characters written on paper. Therefore, the user may have a feeling that something is wrong when the user erases the displayed characters.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary block diagram of a system configuration of the electronic apparatus according to the embodiment.

FIG. 5 is an exemplary flowchart illustrating a procedure of handwritten page preparation processing which is executed by the digital notebook application program.

FIG. 6 is an exemplary diagram illustrating a picture which is displayed by the digital notebook application program on an LCD.

FIG. 7 is an exemplary diagram illustrating a state where a character "E" is erased from the state illustrated in FIG. 6 by pressing an eraser button.

FIG. 8 is an exemplary diagram illustrating strokes of a handwritten character "A".

FIG. 9 is an exemplary diagram illustrating data of the strokes of the handwritten character "A".

DETAILED DESCRIPTION

Various embodiments will be described hereinafter with reference to the accompanying drawings.

In general, according to one embodiment, an electronic apparatus comprises a display processor and a storage module. The display processor is configured to display a first locus input by handwriting with a second color different from a first color equal to a color of a background in an input mode, and to display a second locus input by handwriting with the first color in an erase mode. The storage module is configured to store a first stroke data corresponding to the first locus and a second stroke data corresponding to the second locus. The display processor is configured display an area in which the first locus crosses the second locus with the second color if the first locus is input later than the second locus. The display processor is configured to display the area with the first color if the first locus is input earlier than the second locus.

Figure 1:
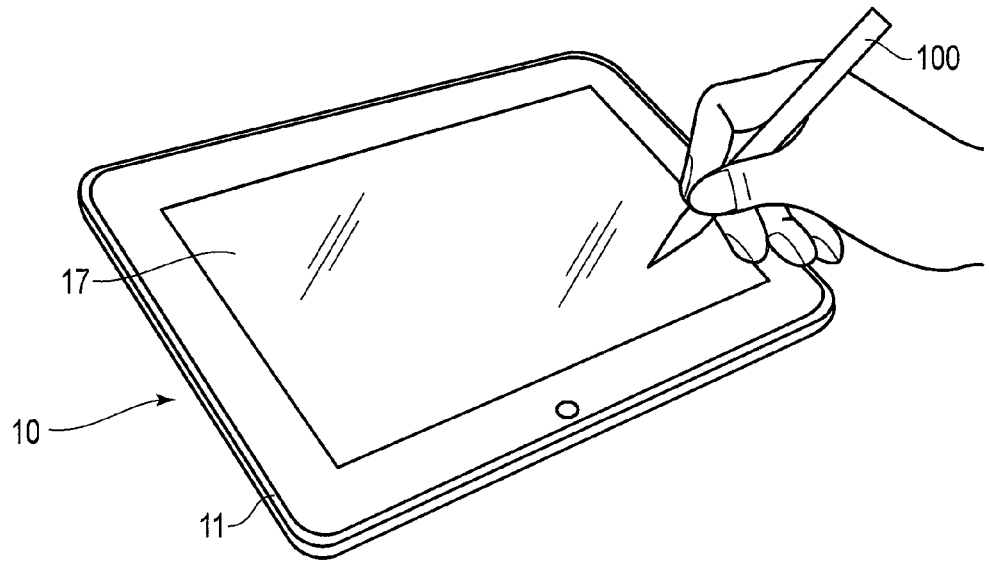
FIG. 1 is an exemplary perspective view illustrating an external appearance of an electronic apparatus according to an embodiment.

FIG. 1 is a perspective view illustrating an external appearance of an electronic apparatus according to an embodiment. The electronic apparatus is, for example, a stylus-based portable electronic apparatus which enables handwriting input by a stylus or a finger. The electronic apparatus can be realized as a tablet computer, a notebook computer, a smartphone, or a PDA. In the following explanation, suppose that the electronic apparatus is realized as a tablet computer 10. The tablet computer 10 is a portable electronic apparatus which is also referred to as a tablet or a slate computer. As illustrated in FIG. 1, the tablet computer 10 includes a main body 11 and a touchscreen display 17. The touchscreen display 17 is attached to and superposed on an upper surface of the main body 11.

The main body 11 includes a housing which has a thin box shape. A flat panel display and a sensor which is configured to sense a position on a screen of the flat panel display, which the stylus or finger touches, are put in the touchscreen display 17. The flat panel display may be, for example, a liquid crystal display (LCD). It is possible to use, for example, a capacitive touchpanel or an inductive digitizer as the sensor. In the following explanation, suppose that both two sensors, that is, a digitizer and a touchpanel, are incorporated in the touchscreen display 17.

Each of the digitizer and the touchpanel are provided to cover the screen of the flat panel display. The touchscreen display 17 can detect not only touch operation on the screen using the user's finger, but also touch operation on the screen using a stylus 100. The stylus 100 may be, for example, an electromagnetic inductive stylus. The user can perform handwriting input operation on the touchscreen display 17, by using an external object (stylus 100 or finger). During the handwriting input operation, loci of movement of the external object (stylus 100 or finger) on the screen, that is, loci (handwriting) of strokes which are made by a handwriting input operation are drawn in real time, and thereby loci of the strokes are displayed on the screen. A locus of movement of the external object which is made while the external object is in contact with the screen corresponds to a stroke. A group of a number of strokes which correspond to handwritten characters or figures, that is, a group of a number of loci (handwriting) forms a handwritten document.

In the present embodiment, the handwritten document is stored in a storage medium, not as image data, but as time-series information which indicates coordinate lines of loci of respective strokes and the order relation between the strokes. The time-series information generally indicates a set of time-series stroke data items which correspond to respective strokes. Each stroke data item corresponds to a stroke, and includes a coordinate data series (time-series coordinates) which correspond to respective dots located on the locus of the stroke. The order of arrangement of these stroke data items corresponds to the writing order of the strokes, that is, the stroke order.

The tablet computer 10 reads out desired existing time-series information from the storage medium, and can display a handwritten document which corresponds to the time-series information, that is, loci which correspond to respective strokes indicated by the time-series information, on the screen. The tablet computer 10 also has an edit function. By the edit function, the user can delete or move any stroke or any handwritten character in the displayed handwritten document, in response to edit operation performed by the user by using an "eraser" tool, a range designation tool, or another tool. In addition, the edit function also includes a function of cancelling history of some handwriting operations.

In the present embodiment, the time-series information (handwritten document) can be managed as one or a plurality of pages. In this case, the time-series information (handwritten document) may be divided into areas, each of which is contained in one picture, and thereby a mass of time-series information which is contained in one picture may be recorded as one page. As another example, the size of the page may be variable. In this case, since the size of the page can be increased to an area which is larger than the size of one screen, a handwritten document of a size which is larger than the screen size can be dealt with as one page. When the whole page cannot be simultaneously displayed on the display, the page may be reduced, or the displayed part in the page may be changed by vertical and horizontal scroll.

Figure 2:
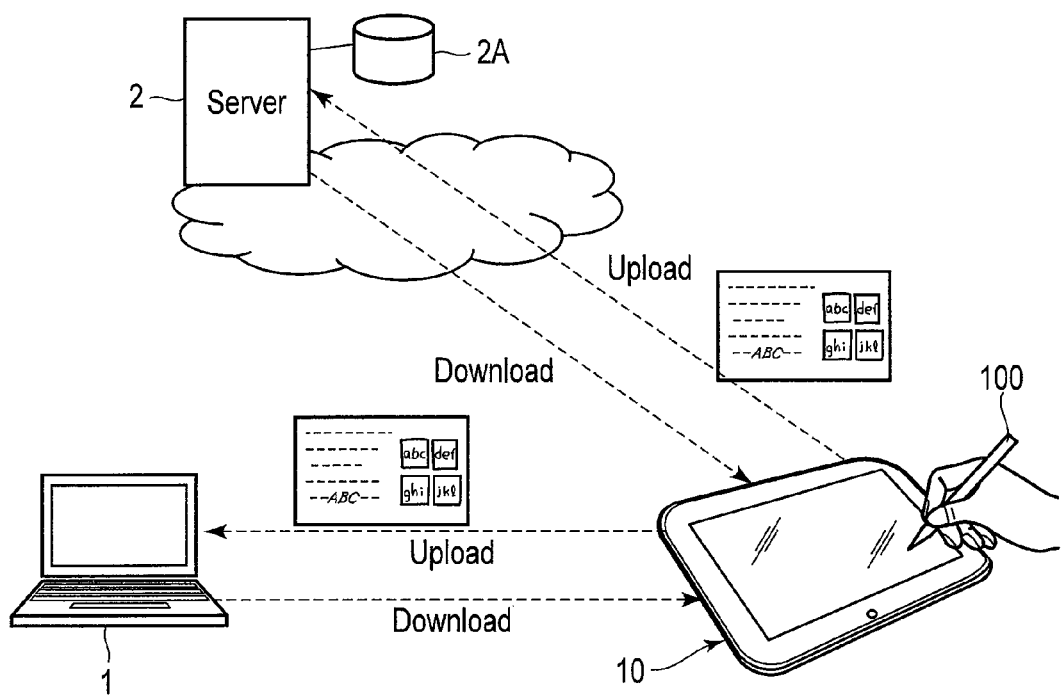
FIG. 2 is an exemplary diagram illustrating coordinated operation of the electronic apparatus of the embodiment and external devices.

FIG. 2 illustrates an example of coordinated operation between the tablet computer 10 and external devices. The tablet computer 10 can cooperate with a personal computer 1 and a cloud. Specifically, the tablet computer 10 includes a wireless communication device such as a wireless LAN, and can execute wireless communication with the personal computer 1. The tablet computer 10 can also communicate with a server 2 on the Internet. The server 2 may be a server which executes an on-line storage service, or other various cloud computing services.

The personal computer 1 includes a storage device such as a hard disk drive (HDD). The tablet computer 10 can transmit time-series information (handwritten document) to the personal computer 1 through the network, and store the information in the HDD of the personal computer 1 (upload). To ensure secure communication between the tablet computer 10 and the personal computer 1, the personal computer 1 may be configured to authenticate the tablet computer 10 when communication is started. In this case, a dialogue which prompts the user to input the ID or password may be displayed on the screen of the tablet computer 10, or the ID or the like of the tablet computer 10 may automatically be transmitted from the tablet computer 10 to the personal computer 1.

Thereby, even when the storage in the tablet computer 10 has small capacity, the tablet computer 10 can deal with a number of time-series information items (handwritten document) or a large capacity of time-series information items (handwritten document).

In addition, the tablet computer 10 can read out (download) one or more desired time-series information items which are stored in the HDD of the personal computer 1, and display loci of strokes indicated by the read time-series information items on the screen of the display 17 of the tablet computer 10. In this case, a list of thumbnails which are obtained by reducing pages of a plurality of time-series information items (handwritten document) may be displayed on the screen of the display 17, or a page which is selected from the thumbnails may be displayed in a regular size on the screen of the display 17.

In addition, the party of communication of the tablet computer 10 may not be a personal computer, but the server 2 on the cloud, which provides storage service and the like. The tablet computer 10 can transmit time-series information (handwritten document) to the server 2 through the network, and store the time-series information (handwritten document) in a storage device 2A of the server 2 (upload). In addition, the tablet computer 10 can read desired time-series information stored in the storage device 2A of the server 2 (download), and display loci of the strokes indicated by the time-series information on the screen of the display 17 of the tablet computer 10.

As described above, according to the present embodiment, the storage medium which stores time-series information may be any of the storage device in the tablet computer 10, the storage device in the personal computer 1, and the storage device of the server 2.

FIG. 3 is a diagram illustrating a system configuration of the tablet computer 10.

As illustrated in FIG. 3, the tablet computer 10 comprises a CPU 101, a system controller 102, a main memory 103, a graphics controller 105, a BIOS-ROM 105, a nonvolatile memory 106, a wireless communication device 107, and an embedded controller (EC) 108.

The CPU 101 is a processor which controls operation of various modules in the tablet computer 10. The CPU 101 executes various software items which are loaded from the nonvolatile memory 106, which is a storage device, into the main memory 103. The software items include an operating system (OS) 201, and various application programs. The application programs include a digital notebook application program 202. The digital notebook application program 202 includes a function of preparing and displaying the handwritten document, a function of editing the handwritten document, and a character and diagram recognition function.

The CPU 101 also executes a basic input/output system (BIOS) which is stored in the BIOS-ROM 105. The BIOS is a program for hardware control.

The system controller 102 is a device which connects a local bus of the CPU 101 with various components. The system controller 102 also includes a memory controller which controls access to the main memory 103. The system controller 102 also includes a function of executing communication with the graphics controller 104 through a serial bus of the PCI EXPRESS standard.

The graphics controller 104 is a display controller which controls the LCD 17A that is used as the display monitor of the tablet computer 10. A display signal which is generated by the graphics controller 104 is transmitted to the LCD 17A. The LCD 17A displays a picture image based on the display signal. A touchpanel 17B and a digitizer 17C are arranged on the LCD 17A. The touchpanel 17B is a capacitive pointing device for performing input on the screen of the LCD 17A. The touchpanel 17B detects a touching position on the screen, in which the user's finger touches the screen, and movement of the touch position. The digitizer 17C is an inductive pointing device for performing input on the screen of the LCD 17A. The digitizer 17C detects a touching position on the screen, in which the stylus 100 touches the screen, and movement of the touching position.

The wireless communication device 107 is a device configured to execute wireless communication such as wireless LAN and 3G mobile communication. The EC 108 is a single-chip microcomputer which includes an embedded controller for electric power control. The EC 108 has a function of turning on and off the tablet computer 10, in response to operation of the power button by the user.

Figure 4:
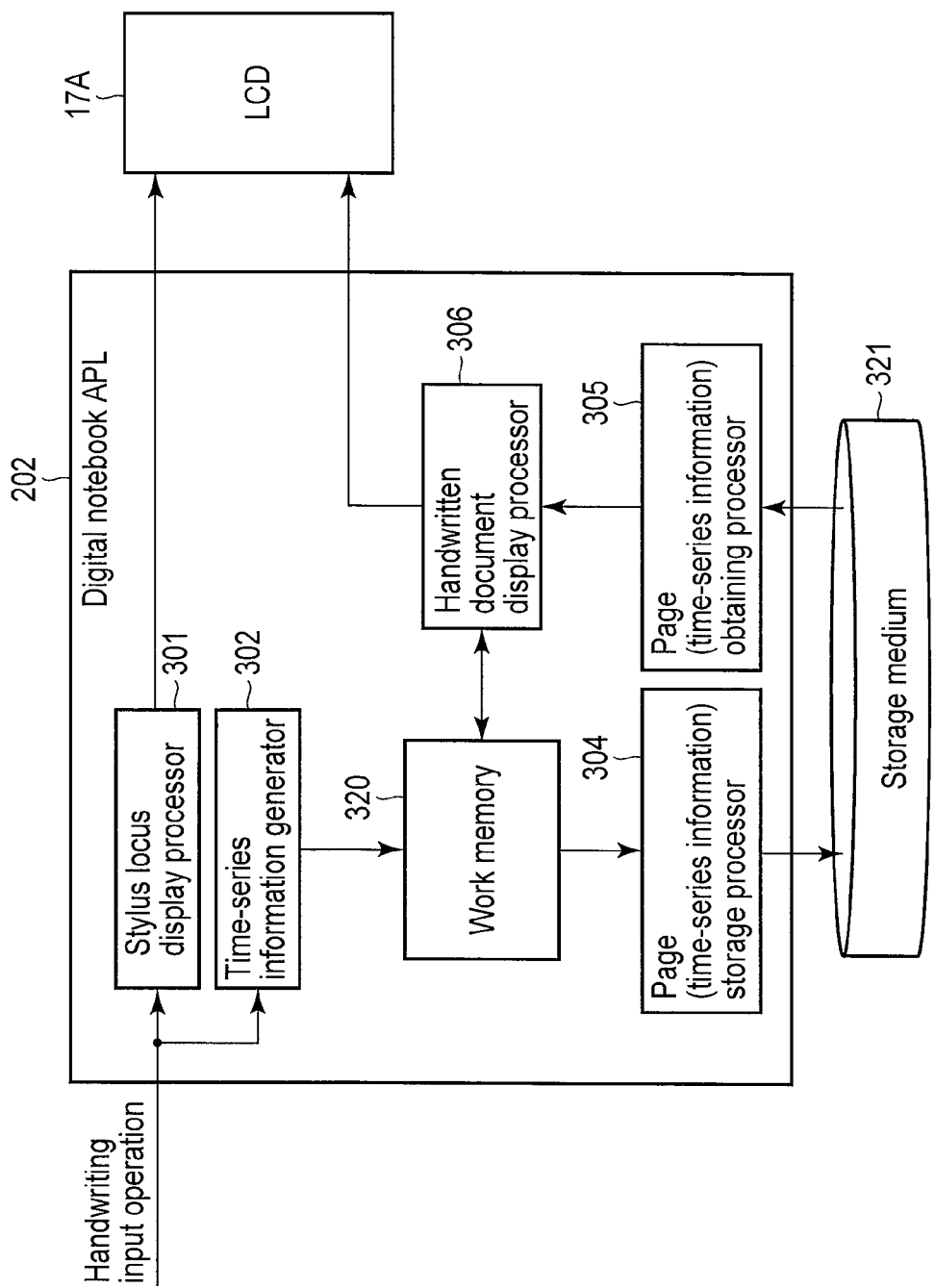
FIG. 4 is an exemplary block diagram of a functional configuration of a digital notebook application program.

Next, a functional configuration of the digital notebook application program 202 will be explained hereinafter with reference to FIG. 4.

The digital notebook application program 202 includes a stylus locus display processor 301, a time-series information generator 302, a page storage processor 304, a page obtaining processor 305, a handwritten document display processor 306, and a processor 308.

The digital notebook application program 202 prepares, displays, and edits a handwritten document, by using stroke data items which are input by using the touchscreen display 17. The touchscreen display 17 is configured to detect occurrence of events such as "touch", "slide", and "release".

The event "touch" is an event which indicates a touch of an external object on the screen. The event "slide" is an event which indicates that the touching position is moved while the external object is in contact with the screen. The event "release" is an event which indicates that the external object is separated from the screen.

The stylus locus display processor 301 and the time-series information generator 302 receive the event "touch" or "slide" which is generated by the touchscreen display 17, and thereby detect a handwriting input operation. The event "touch" includes coordinates of the touching position. The event "slide" also includes coordinates of the touching position after sliding. Therefore, the stylus locus display processor 301 and the time-series information generator 302 can receive a coordinate line which corresponds to the locus of movement of the touching position, from the touchscreen display 17.

The stylus locus display processor 301 receives coordinate lines from the touchscreen display 17, and displays loci of strokes which are written by hand by a handwriting input operation using the stylus 100 or the like on the screen of the LCD 17A in the touchscreen display 17, based on the coordinate lines. The stylus locus display processor 301 draws loci of the stylus 100 which are made while the stylus 100 is in contact with the screen, that is, loci of the strokes, on the screen of the LCD 17A.

The time-series information generator 302 receives the coordinate lines outputted from the touchscreen display 17, and generates time-series information based on the coordinate lines. In this case, the time-series information, that is, coordinates which corresponds to each point of the stroke and time stamp information may be temporarily stored in a work memory 320.

The page storage processor 304 stores the generated time-series information in a storage medium 321 as a handwritten document (handwritten page). As described above, the storage medium 321 may be either of the storage device in the tablet computer 10 and a storage device which is used over a network or USB.

The page obtaining processor 305 reads out desired time-series information, which has already been stored in the storage medium 321, from the storage medium 321. The read time-series information is transmitted to the handwritten document display processor 306. The handwritten document display processor 306 analyzes the time-series information, and displays loci of strokes indicated by the time-series information on the screen as a handwritten page, based on a result of the analysis.

The processor 308 can execute various processing for the time-series information to be processed, such as handwriting retrieval processing. The processor 308 includes a recognition processor 311.

The recognition processor 311 executes recognition processing such as handwritten character recognition, handwritten figure recognition, and handwritten table recognition, for handwritten character lines or figures in the displayed time-series information (handwritten page). The recognition processor 311 executes recognition processing at fixed time intervals, or with page switching operation used as a trigger.

The recognition processor 311 recognizes, as a character, each of a plurality of blocks (handwriting blocks) which are obtained by grouping a plurality of stroke data items indicated by the time-series information to be recognized, and converts each handwritten character in the blocks into a character code. In the grouping processing, a plurality of stroke data items indicated by the time-series information to be processed are grouped, such that stroke data items which correspond to respective strokes that are located close to each other and are successively written by hand are classified into the same block.

Next, procedure of handwritten page preparation processing which is executed by the digital notebook application program 202 will be explained hereinafter, with reference to a flowchart of FIG. 5.

When the user performs a handwriting input operation by using the stylus 100 (Step S11), events such as "touch" and "slide" are generated. Based on the events, the digital notebook application program 202 detects a locus of movement of the stylus 100 (Step S12). When a locus of movement of the stylus 100 is detected (YES of Step S12), the digital notebook application program 202 displays the detected locus of movement of the stylus 100 on the display (Step S13). In addition, the digital notebook application program 202 generates the above time-series information based on a coordinate line which corresponds to the detected locus of movement of the stylus 100, and temporarily stores the time-series information in the work memory 320 (Step S14).

FIG. 6 illustrates a picture which is displayed by the digital notebook application program 202 on the LCD 17A.

A picture 400 has a display area 401 in which handwritten characters are input and displayed. Five characters "A", "B", "C", "D", and "E" are displayed in the display area 401.

Graphical user interface (GUI) elements such as a new page button 411, a previous page button 412, a following page button 413, a page position 414, and an eraser button 415 are displayed under the display area 401.

The new page button 441 is provided to add a new page. The previous page button 412 and the following page button 413 are provided to change the page which is displayed in the display area 401. When the page is changed, the locus data of the page which was being edited is automatically stored. The page position 414 is provided to display the page which is displayed in the display area 401. The eraser button 415 is provided to change the mode from the input mode to the erase mode, and use the stylus 100 or the finger as the eraser.

FIG. 7 is a diagram illustrating a state where the character "E" is erased after pressing the eraser button 415. As illustrated in FIG. 7, in the eraser mode, a pencil button 416 is displayed instead of the eraser button 415. The pencil button 416 is provided to change the mode from the erase mode to the input mode, and use the stylus 100 and the finger as the pencil. Although a broken line is shown to indicate the area which is erased by the eraser in FIG. 7, the broken line is not displayed in the actual picture.

The input mode is a mode in which the user can input a desired locus by handwriting. Loci which are input by handwriting in the input mode are displayed with a color which is different from the background color. The erase mode is a mode in which the user can delete at least part of the desired locus which has already been input. Loci which are input by handwriting in the erase mode are displayed with the same color as the background color. The method of switching the input mode with the erase mode is not limited to the eraser button 415 and the pencil button 416, but any method may be used.

In the erase mode, the stylus locus display processor 301 draws a locus of the stylus 100 or the finger with the same color as the color of the background image on the LCD 17A. The recognition processor 311 excludes the character erased by the user from the output object after recognition processing.

FIG. 8 is a diagram illustrating strokes of the handwritten character "A". As illustrated in FIG. 8, the handwritten character "A" is formed of a stroke 601 and a stroke 602.

FIG. 9 is a diagram illustrating an example of data items of strokes of the handwritten character "A". As illustrated in FIG. 9, each stroke data item includes a number which indicates the order of the stroke in the page, a stylus type which indicates whether the stylus type is a pencil or an eraser, time information which indicates the time of stylus down, and point information which indicates coordinates which are sampled at fixed time intervals from stylus down to stylus up. The stroke data items are not limited to the above, but may be of any form as long as it can be recognized whether the mode in which each locus is input is the input mode or the erase mode. The stroke data items may also include data for recognizing the order of handwriting input of each locus, in addition to the above.

Figures 10, 11, 12:
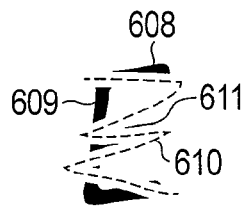
FIG. 10 is an exemplary diagram illustrating strokes of a handwritten character "E" and the eraser.
FIG. 11 is an exemplary diagram illustrating data of the strokes of the handwritten character "E" and the eraser.
FIG. 12 is an exemplary diagram illustrating result data obtained when character recognition processing is performed in the state of FIG. 10.

FIG. 10 is a diagram illustrating strokes of the handwritten character "E" and the eraser. As illustrated in FIG. 10, the handwritten character "E" is formed of a stroke 608, a stroke 609, and a stroke 610. The eraser is formed of a stroke 611.

FIG. 11 is a diagram illustrating data items of strokes of the handwritten character "E" and the eraser. As illustrated in FIG. 11, a data item of each stroke includes a number which indicates the order of the stroke in the page, a stylus type which indicates whether the stylus type is the pencil or the eraser, time information which indicates the time of stylus down, and point information which indicates coordinates which are sampled at fixed time intervals from stylus down to stylus up. Since each stroke data item include the number which indicates the order of the stroke in the page, the handwriting input order of each locus can be recognized. Since each stroke data item include the time information which indicates the time of stylus down, the time when each locus of the pencil or the eraser is input can be recognized, and the work which the user successively performed, and the user's intention can be recognized with high accuracy.

As illustrated in FIG. 11, the eraser information is defined as a type of the stylus, and the eraser itself is recorded as a stroke.

FIG. 12 illustrates result data obtained when character recognition processing is performed in the state of FIG. 10. The recognition processor 311 once performs recognition processing also for the character "E" which is recognized by user as having been erased, and obtains a circumscribed rectangle for the character "E" as a character. The recognition processor 311 calculates a circumscribed rectangle for a locus of the eraser, although it does not recognize the locus of the eraser as a character. The recognition processor 311 excludes a character, which corresponds to a block that was generated earlier than the rectangle of the eraser and overlaps the circumscribed rectangle area, from output of the final character recognition result.

Figures 13, 14, 15:
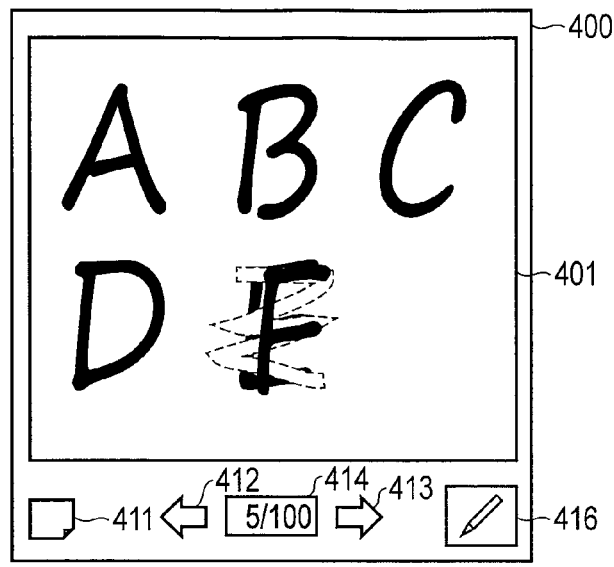
FIG. 13 is an exemplary diagram illustrating a state where a handwritten character "F" is input onto loci of the handwritten character "E" and the eraser from the state of FIG. 10.
FIG. 14 is an exemplary diagram illustrating stroke data of the newly input handwritten character "F".
FIG. 15 is an exemplary diagram illustrating result data obtained when character recognition processing is performed in the state of FIG. 13.

FIG. 13 illustrates a diagram illustrating a state in which a handwritten character "F" is input onto the loci of the handwritten character "E" and the eraser from the state illustrated in FIG. 10.

As illustrated in FIG. 13, when a new handwritten character is input onto the locus of the eraser, the recognition processor 311 performs character recognition for the newly input handwritten character. The character code which is obtained as a result of character recognition is included in the final character recognition result. As illustrated in FIG. 13, when the handwritten character "E" is input earlier than the locus of the eraser, an area in which the handwritten character "E" crosses the locus of the eraser is displayed with background color. When the handwritten character "F" is input later than the locus of the eraser, an area in which the handwritten character "F" crosses the locus of the eraser is indicated by the black.

FIG. 14 is a diagram illustrating stroke data items of the newly input handwritten character "F".

FIG. 15 illustrates recognition result data obtained when character recognition processing is performed in the state of FIG. 13. The recognition processor 311 performs recognition processing also for the newly input character "F", and obtains a circumscribed rectangle for it as a character. The recognition processor 311 includes a character, which has been made later than the rectangle of the eraser and is included in the rectangle area, in the output of the final character recognition result.

Figure 16:
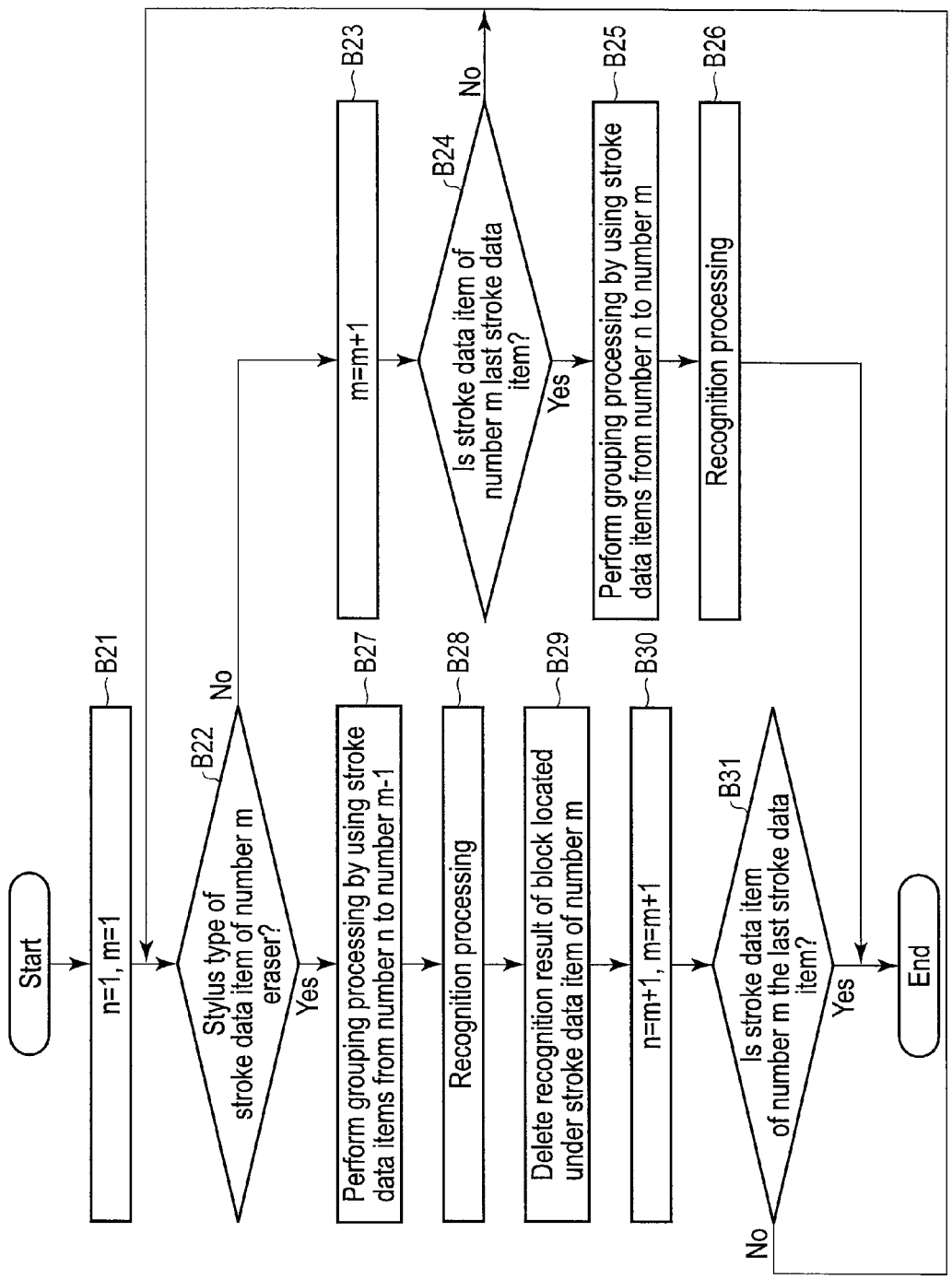
FIG. 16 is an exemplary flowchart illustrating a procedure of recognizing a character.

FIG. 16 is a flowchart illustrating procedure of recognizing characters.

The recognition processor 311 set the value of n to 1, and the value of m to 1 (Block B21). The recognition processor 311 determines whether the stylus type of the stroke data of number m is the eraser or not (Block B22). When it is determined that the stylus type of the stroke data of number m is not the eraser (No of Block B22), the recognition processor 311 changes the value of m to "m+1" (Block B23). The recognition processor 311 determines whether the stroke data item of number m is the last stroke data item or not (Block B24). When it is determined that the stroke data item is not the last stroke data item (No of Block B24), the recognition processor 311 executes processing from Block B22 in order.

When it is determined that the stroke data is the last stroke data, the recognition processor 311 executes grouping processing by using the stroke data items from number n to number m (Block B25). Then, the recognition processor 311 performs character recognition for each of a plurality of blocks obtained by grouping processing, and converts each of handwritten characters of in the blocks into a character code (Block B26).

At Block B22, when it is determined that the stylus type of the stroke data of number m is the eraser (Yes of Block B22), the recognition processor 311 executes grouping processing by using the stroke data items from number n to number m−1 (Block B27). Then, the recognition processor 311 executes character recognition for each of a plurality of blocks obtained by the grouping processing, and converts each of handwritten characters in the blocks into a character code (Block B28).

The recognition processor 311 deletes a character, which corresponds to a block that was input before input of the stroke data item of number m and overlaps the circumscribed rectangle area of the stroke data item of number m, from all the recognition results (Block B29). The recognition processor 311 changes the value of n to "n+1", and changes the value of m to "m+1" (Block B30). Then, the recognition processor 311 determines whether the stroke data item of number m is the last stroke data item or not (Block B31). When it is determined that the stroke data item of number m is not the last stroke data item (No of Block B31), the recognition processor executes the processing from Block B22 in order.

When it is determined that the stroke data item of number m is the last stroke data item (Yes of Block B31), the recognition processor 311 ends the processing.

The above handwriting retrieval processing and recognition processing (character recognition processing, figure recognition processing, table recognition processing) may be executed by the personal computer 1 or the server 2 on the Internet, which operate in cooperation with the tablet computer 10. The above selection processing may also be executed by the personal computer 1 or the server 2.

In the input mode, the tablet computer 10 can display a first locus which is input by handwriting with a second color that is different from the same color (first color) as that of the background. In the erase mode, the tablet computer 10 can display a second locus which is input by handwriting with the first color. The tablet computer 10 can recognize whether the mode was the input mode and the erase mode when the first locus and the second locus were input, when a first stroke data item which corresponds to the first locus and a second stroke data item which corresponds to the second locus are stored, and can store the input order of the first locus and the second locus. Thereby, after the first stroke data item and the second stroke data item are read out, the tablet computer 10 can display the area in which the first locus crosses the second locus with the second color, when the first locus is input later than the second locus, and display the area in which the first locus crosses the second locus with the first color, when the first locus is input earlier than the second locus. Thereby, when the locus which is input by handwriting is erased, it is possible to realize a sense of operation which is obtained when the locus which is written by hand on paper is erased by the eraser.

According to the present embodiment, after recognition processing, since the recognition result is deleted when the stroke of the eraser touches the circumscribed rectangle of the character, it is possible to prevent erroneous recognition of a constituent stroke such as a point which is left without being erased. In addition, since the stroke itself is not deleted, a sense of using the eraser can be maintained.

Although the tablet computer 10 in the above embodiment includes a touchscreen as display device, the tablet computer 10 may not include a touchscreen. For example, the tablet computer 10 may have the structure in which an external display device which does not have function of detecting a touching position on the screen is connected to the computer, and a stylus tablet such as a digitizer is connected to the computer. The tablet computer 10 may have the structure in which stroke data which is related to handwriting input is obtained from the server.

Various processing for the handwritten document in the present embodiment may be realized by a computer program, and thus the same effect as the present embodiment can easily be obtained only by installing the computer program in an ordinary computer including a touchscreen display, and executing the computer program, through a computer-readable storage medium which stores the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    a display circuitry processor to display a locus input by handwriting with a second color in an input mode, and to display a locus input by handwriting with a first color in an erase mode, the first color equal to a background color and different from the second color;
    a storage circuitry to store information comprising of a first locus handwritten in the input mode, a second locus handwritten in the erase mode, and a third locus handwritten in the input mode after the second locus, the first locus, the second locus, and the third locus recognizable in an input order; and
    a processing circuitry configured to generate a circumscribed rectangle of a first character recognized based on the first locus, and when the second locus touches the circumscribed rectangle of the first character, character recognition of the first character is deleted, wherein the display processor is configured to display the first, second and third locus even when the character recognition of the first character is deleted, and the circumscribed rectangle comprises the first locus and a remaining area within the circumscribed rectangle.

2. The apparatus of claim 1
    the display circuitry to display a first area in which the first locus crosses the second locus with the first color, and to display an area in which the third locus crosses the first locus and the second locus with the second color.

3. The apparatus of claim 1, the processing circuitry to performs a process of a character recognition for acquiring a first character code- or a second character code.

4. A handwritten document processing method, comprising:
    displaying a locus input by handwriting with a second color different from a first color equal to a color of a background in an input mode by a display processor;

displaying a locus input by handwriting with the first color in an erase mode;

storing a first stroke data of a first locus handwritten in the input mode, a second stroke data of a second locus handwritten in the erase mode, and third stroke data of a third locus handwritten after the second locus in the input mode, the first locus, the second locus, and the third locus recognizable in an input order; and generating a circumscribed rectangle of a first character recognized based on the first locus, and when the second locus touches the circumscribed rectangle of the first character, character recognition of the first character is deleted, wherein the display processor is configured to display the first, second and third locus even when the character recognition of the first character is deleted, and the circumscribed rectangle comprises the first locus and a remaining area within the circumscribed rectangle.

5. A non-transitory computer-readable storage medium storing computer-executable instructions that, if executed, cause a computer to:

display a locus input by handwriting with a second color different from a first color equal to a color of a background in an input mode;

display a locus input by handwriting with the first color in an erase mode; and store a first stroke data of a first locus handwritten in the input mode, a second stroke data of a second locus handwritten in the erase mode, and third stroke data of a third locus handwritten after the second locus in an input mode data, the first locus, the second locus, and the third locus recognizable in an input order;

generate a circumscribed rectangle of a first character recognized based on the first locus, and when the second locus touches the circumscribed rectangle of the first character, character recognition of the first character is deleted; and displaying the first, second and third locus even when the character recognition of the first character is deleted, and the circumscribed rectangle comprises the first locus and a remaining area within the circumscribed rectangle.

6. The method of claim 4, further comprising:

displaying a first area in which the first locus crosses the second locus with the first color; and displaying an area in which the third locus crosses the first locus and the second locus with the second color.

7. The method of claim 4, further comprising:

performing a process of a character recognition for acquiring a first character code or a second character code.

8. The medium of claim 5, if executed, cause the computer to:

display a first area in which the first locus crosses the second locus with the first color; and display an area in which the third locus crosses the first locus and the second locus with the second color.

9. The medium of claim 5, if executed, cause the computer to:

perform a process of a character recognition for acquiring a first character code or a second character code.

* * * * *